T. Silver.
Governor.
No. 2,039. Reissued July 25, 1865.
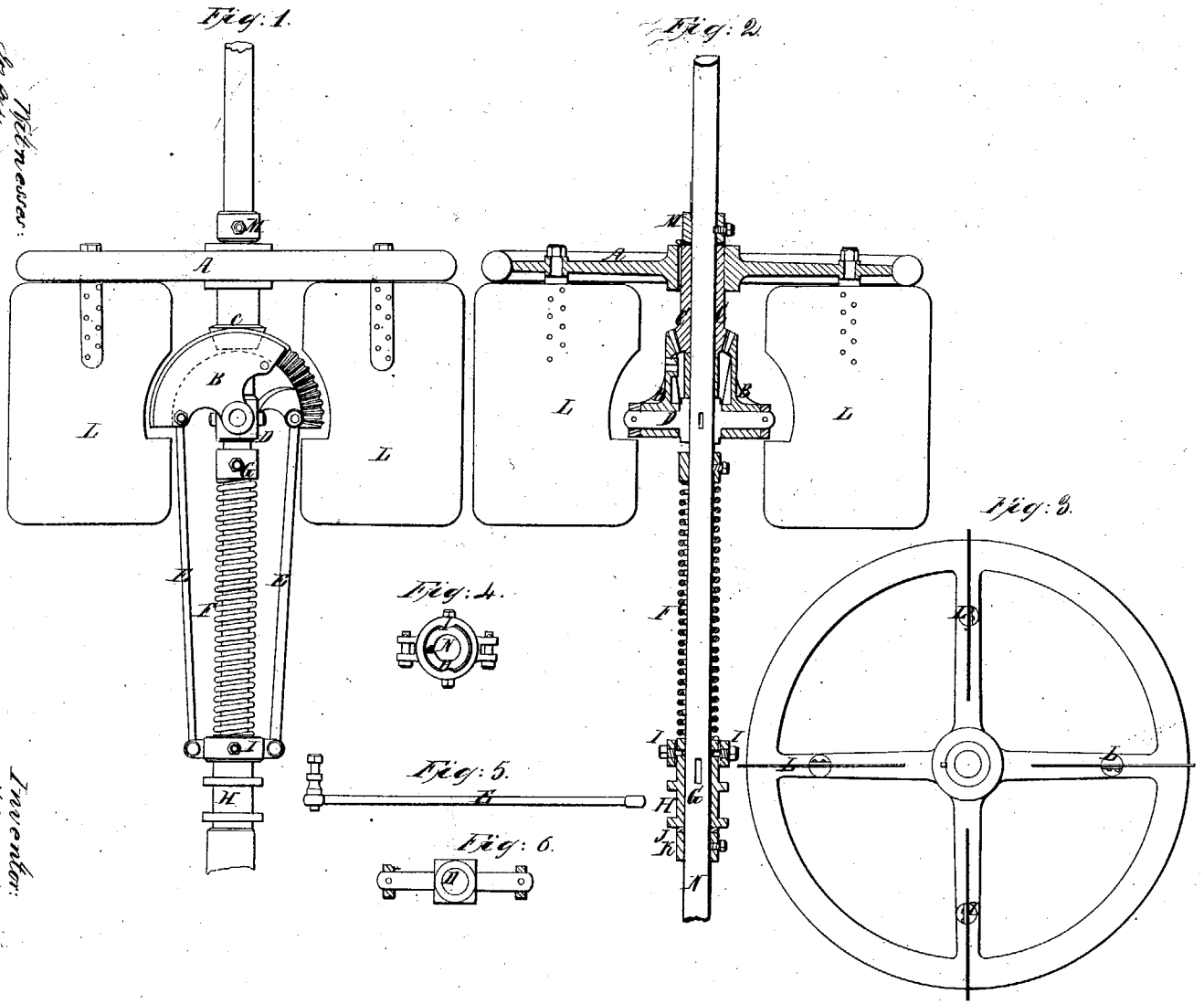
Witnesses:
Jos. W. Harrison
Theodore L. Lamb
Inventor:
Thos. Silver
N. PETERS, PHOTO-LITHOGRAPHER, WASHINGTON, D. C.

UNITED STATES PATENT OFFICE.

THOMAS SILVER, OF NEW YORK, N. Y.

IMPROVEMENT IN STEAM-ENGINE GOVERNORS.

Specification forming part of Letters Patent No. 23,790, dated April 26, 1859; Reissue No. 2,039, dated July 25, 1865.

*To all whom it may concern:*

Be it known that I, THOMAS SILVER, formerly of Philadelphia, Pennsylvania, but now of New York, in the county and State of New York, have invented certain new and useful Improvements in Governors for Regulating the Speed of Steam-Engines; and I hereby declare that the following is a full, clear, and exact description of the same, reference being had to the accompanying drawings and letters of reference marked thereon.

The nature of my invention consists of a shaft or spindle, which, for the purpose of greater convenience for communicating motion to it from the main shaft or other rotating portion of a steam-engine, is usually placed in a horizontal position on proper bearings, and driven by gearing, pulley, or any suitable means, said shaft having upon it and turning loosely in the center a fly or momentum wheel, and at the center of which is firmly fixed a toothed pinion or boss. Near this toothed pinion or boss is fixed upon or through the aforesaid shaft or spindle a cross-head or bearing, which forms an axis for two toothed wheels or sectors on opposite sides of the shaft or spindle, and gearing into the aforesaid toothed pinion or boss, the movement of the toothed wheels or sectors being the one to the right and the other to the left. When the momentum-wheel is turned upon the shaft or spindle in order to communicate an up or down motion from the aforesaid toothed wheels or sectors to a sliding sleeve upon the shaft or spindle, cords, links, or connecting-rods, connect the former with the latter. In order to distend the sliding sleeve to as great a distance as possible from the cross-head that bears the toothed wheels or sectors, a spiral spring is fixed upon the shaft or spindle between the two, which serves also to cause the momentum or fly wheel to rotate at a greater speed than the shaft or spindle that bears it; or rather, if it (shaft or spindle) should commence to rotate, the momentum-wheel is drawn after it until it attains its proper relative speed by force of the spring, the latter also serving to work the throttle-valve. In order to limit the speed of the fly or momentum wheel as desired, there are affixed two or more vanes or fans that can be adjusted to any angle to suit the required resistance to the atmosphere, and set with a nut or set-screw; or, as the aforesaid spring naturally increases its force as it is compressed and would have a tendency to impel the fly-wheel more rapidly, the vanes may be fixed eccentrically and have springs attached to them that shall hold them partially from the resistance of the atmosphere, but in a position at which they shall impinge the latter to a greater degree as the momentum-wheel should have a tendency to increase its speed—in short, acting reversely in principle to that of a self-regulating windmill. In fact, a good governor may be constructed on this principle alone. For the purpose of obtaining additional immediate power, however, I prefer to add the momentum-wheel in order to get the benefit of its weight or inertia to assist in the overcoming of the friction or hesitancy of the throttle-valve and other connected parts to move; but when used for marine-engines, the self-regulating arrangement of the vanes to correspond with the increased tension of the spring is unnecessary, as I substitute it by attaching the lifting-links to the side sectors or bevel-wheels in such a position that as the latter turns upward the connecting-points are drawn partially over their axis of motion, thereby obtaining a leverage force over the springs in comparison, or sufficiently so for practical purpose, as it increases its tension by compression; but, if thought more desirable, the side wheels or sectors may be fixed eccentrically, with their teeth working in a long straight pinion. In the place of vanes being fixed upon the fly-wheel to limit its speed, a friction-roller may rest upon its periphery, the axis of which may bear vanes and also additional small fly-wheels, if needed, to retard its speed. The aforesaid sliding sleeve has in its lower end a slot in which the fork of a lever or rock-shaft works, and communicates motion to the throttle-valve in the ordinary manner of governors.

To enable others to construct and apply my invention, I proceed to describe its plans, &c.

Figure 1 of the annexed drawings is a view of a completed instrument without or driving gearing. Fig. 2 is a sectional view of the same. Fig. 3 is a view of the fly-wheel, letters of reference on Figs. 1 and 2 meaning the same.

A is the fly or momentum wheel; B, toothed wheels or sectors; C, boss or toothed pinion; D, cross-head upon or through the shaft or spindle; E E connecting links or cords; F, the spring; G, a collar by which the spring may be compressed and maintained by a set-screw; H, the sliding sleeve; I, cross-head which surrounds the upper end of the sliding sleeve and rests upon pins, that it may vibrate to accommodate any variation in the action of the toothed wheels or sectors; K, a fixed collar for the sliding sleeve to drop against; L, vanes or fans; M, a collar to hold the fly-wheel in its position; N, shaft or spindle.

Fig. 4 is a sectional view of the cross-head N; Fig. 5, connecting-links and stud; Fig. 6, sectional view of cross-head that bears the toothed wheels or sectors.

It will now be seen that when the instrument is in action while the shaft or spindle and momentum-wheel rotate with the same velocity the sliding sleeve will remain distended to the collar K; but upon the shaft being impelled by the increased speed of an engine with a greater rapidity than the momentum-wheel, and carrying therewith the toothed wheels or sectors, the latter, impinging upon the toothed boss or pinion, are turned, the one to the right and the other to the left, drawing the collar H toward them, and compressing the spring and closing the throttle-valve; or, on the other hand, should the engine slack its speed the momentum-wheel, with the aid of the spring, maintains its velocity and thereby draws the throttle-valve open.

Having now fully described my invention, what I claim in its arrangements as a novelty, and desire to secure by Letters Patent, is—

The combination of a spring with a momentum-wheel and adjustable speed-limiting vanes, the whole constructed with the combination of the peculiarly-adjusted sectors, pinion, and links, as fully described and set forth.

In testimony whereof I have signed my name to this specification before two subscribing witnesses.

THOS. SILVER.

Witnesses:
A. POLLAK,
EDM. F. BROWN.